United States Patent
Alves et al.

(10) Patent No.: US 10,671,618 B2
(45) Date of Patent: Jun. 2, 2020

(54) CURRICULUM CREATION USING COGNITIVE COMPUTING

(71) Applicant: International Business Machines Corporation, Armonk, NY (US)

(72) Inventors: Claudio Calazans O. Alves, Rio de Janeiro (BR); Ian D. Douglas, Calgary (CA); Joel P. Sundman, Portage, MI (US); Karim Younsi, Dubai (AE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 15/407,298

(22) Filed: Jan. 17, 2017

(65) Prior Publication Data
US 2018/0203859 A1 Jul. 19, 2018

(51) Int. Cl.
*G06F 16/00* (2019.01)
*G06F 16/2457* (2019.01)
*G09B 5/02* (2006.01)
*G06Q 50/20* (2012.01)
*G06Q 50/00* (2012.01)

(52) U.S. Cl.
CPC ......... *G06F 16/24578* (2019.01); *G09B 5/02* (2013.01); *G06Q 50/01* (2013.01); *G06Q 50/20* (2013.01)

(58) Field of Classification Search
None
See application file for complete search history.

(56) References Cited

U.S. PATENT DOCUMENTS

| 8,136,034 | B2 | 3/2012 | Stanton et al. |
| 8,145,623 | B1* | 3/2012 | Mehta ................. G06F 17/3064 707/713 |
| 8,540,518 | B2 | 9/2013 | Tharanathan et al. |
| 2004/0086833 | A1 | 5/2004 | Goldberg |
| 2005/0053903 | A1 | 3/2005 | Darling |
| 2014/0017653 | A1* | 1/2014 | Romney ................ G09B 7/00 434/350 |

(Continued)

OTHER PUBLICATIONS

"Social Data Analysis as unobtrusive measure for validating human behavior assessment or test (Psychometric) results," [online] IP.com Prior Art Database Technical Disclosure, IPCOM000208050D, Jun. 21, 2011, 10 pg.

(Continued)

*Primary Examiner* — Son T Hoang
(74) *Attorney, Agent, or Firm* — Cuenot, Forsythe & Kim, LLC

(57) ABSTRACT

Computer-implemented curriculum creation can include determining, using a processor, inquiries for educational content from data aggregated from a plurality of different users over time, determining, using the processor, topics of the inquiries, and categorizing, using the processor, the inquiries into groups based upon the topics. Computer-implemented curriculum creation may include searching, using the processor, for educational content for a subset of the topics, wherein the topics of the subset are selected based upon a ranking of the topics, and determining, using the processor, whether educational content is available for the topics of the subset based upon results of the searching.

12 Claims, 3 Drawing Sheets

(56) References Cited

U.S. PATENT DOCUMENTS

| | | | |
|---|---|---|---|
| 2014/0059443 A1* | 2/2014 | Tabe | H04L 51/32 |
| | | | 715/738 |
| 2014/0129246 A1* | 5/2014 | Vdovjak | G06F 19/325 |
| | | | 705/2 |
| 2014/0272914 A1 | 9/2014 | Baraniuk et al. | |
| 2015/0027922 A1 | 1/2015 | Fresco | |
| 2015/0302097 A1* | 10/2015 | Focacci | G06F 17/30705 |
| | | | 707/723 |

OTHER PUBLICATIONS

"Method and Apparatus for Trust, Vicinity, Natural Language Processing Based Collaboration Leveraging Insights-Based Cognitive Models", [online] IP.com Prior Art Database Technical Disclosure, IPCOM000241376D, Apr. 21, 2015, 5 pg.

"Cognitive Feedback for Presentation," [online] IP.com Prior Art Database Technical Disclosure, IPCOM000244179D, Nov. 20, 2015, 4 pg.

\* cited by examiner

CURRICULUM CREATION USING COGNITIVE COMPUTING

BACKGROUND

This disclosure relates to curriculum creation using cognitive computing. Many organizations, whether business entities, not-for profits, or educational institutions, create curricula to provide education and training to members. A well-developed curriculum not only provides individuals with essential skills for performing particular roles, jobs, or functions, but also provides individuals with expanded educational opportunities thereby affording the individuals opportunities for advancement and personal growth.

Decisions relating to curricula creation are often controlled by a particular group of educators and trainers. The group determines the topics deemed important enough to merit development of educational materials with the aid of input from managers, persons of interest, specialists, etc.

SUMMARY

One or more embodiments are directed to computer-implemented methods of curriculum creation. In one aspect, a method can include determining, using a processor, inquiries for educational content from data aggregated from a plurality of different users over time, determining, using the processor, topics of the inquiries, and categorizing, using the processor, the inquiries into groups based upon the topics. The method can include searching, using the processor, for educational content for a subset of the topics. The topics of the subset can be selected based upon a ranking of the topics. The method can include determining, using the processor, whether educational content is available for the topics of the subset based upon results of the searching.

One or more embodiments are directed to systems for curriculum creation. In one aspect, a system includes a processor configured to initiate executable operations. The executable operations can include determining inquiries for educational content from data aggregated from a plurality of different users over time, determining topics of the inquiries, and categorizing the inquiries into groups based upon the topics. The executable operations can include searching for educational content for a subset of the topics. The topics of the subset can be selected based upon a ranking of the topics. The executable operations can include determining whether educational content is available for the topics of the subset based upon results of the searching.

One or more embodiments are directed to a computer program product for curriculum creation. In one aspect, the computer program product includes a computer readable storage medium having program code stored thereon. The program code is executable by a processor to perform executable operations. The executable operations can include determining, using the processor, inquiries for educational content from data aggregated from a plurality of different users over time, determining, using the processor, topics of the inquiries, and categorizing, using the processor, the inquiries into groups based upon the topics. The executable operations can include searching, using the processor, for educational content for a subset of the topics. The topics of the subset can be selected based upon a ranking of the topics. The executable operations can also include determining, using the processor, whether educational content is available for the topics of the subset based upon results of the searching.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
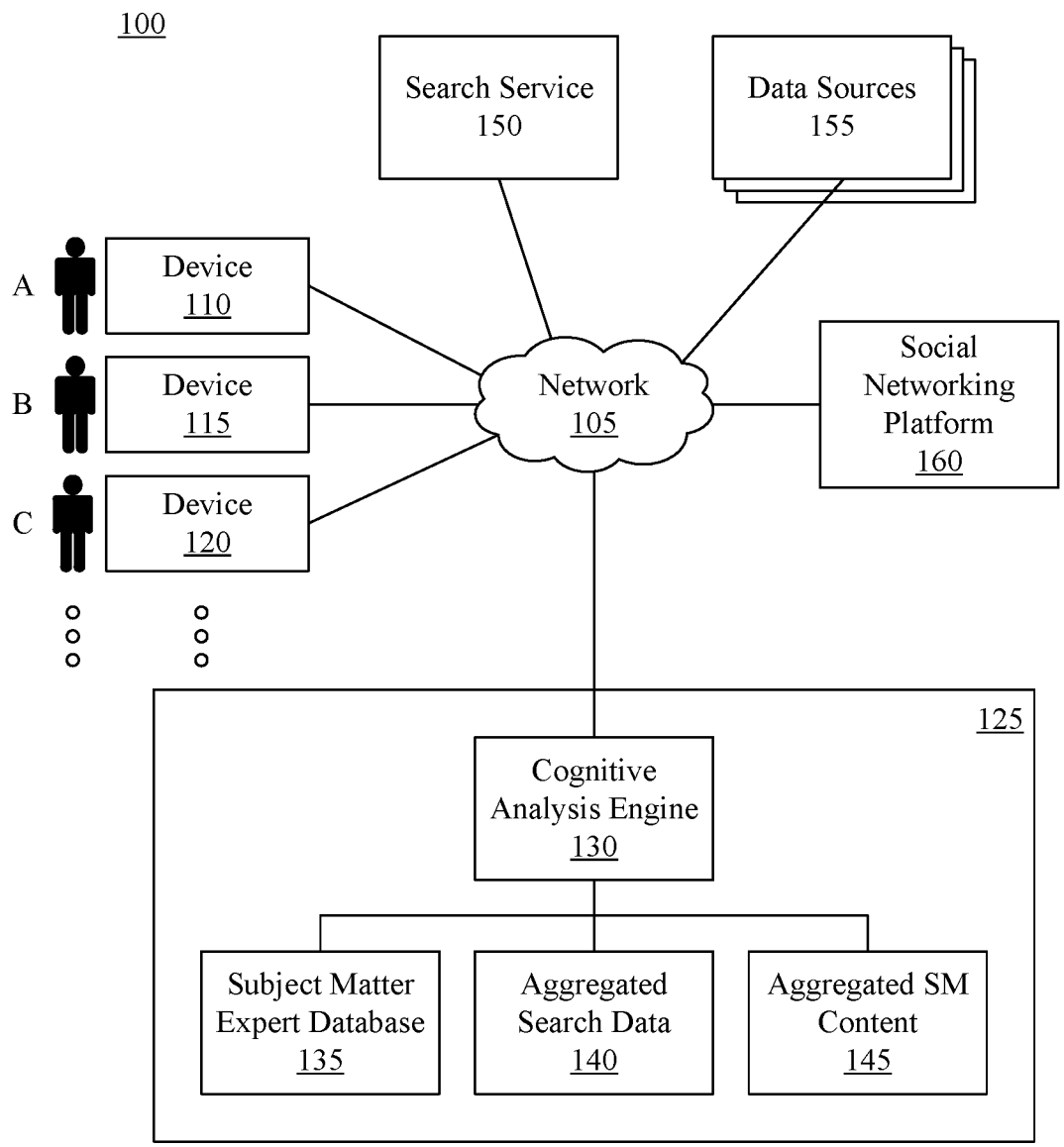
FIG. 1 illustrates an example of a network computing system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to curriculum creation using cognitive computing. One or more embodiments described within this disclosure are directed to determining whether a need for educational content exists. Embodiments of the present invention recognize that current methods of generating educational materials may be reactive in nature resulting in a lag between the need for educational materials and the creation of such materials. In particular areas such as technology, for example, curricula become outdated quickly. Further, entirely new domains of expertise emerge that may not be recognized by the decision makers responsible for selection and/or generation of educational materials. The lack of educational materials where needed may adversely affect an organization's ability to operate and remain competitive.

In one or more embodiments, a system is capable of proactively determining whether a need exists for educational content based upon an analysis of computer-based searches and/or discussions found through social media. The system may detect trends and/or other indicators from an analysis of searches and/or discussions over time to determine the particular topics being searched and the topics for which educational content is sought by users. As such, the system is able to anticipate the need for educational content. The example embodiments described herein are capable of anticipating the need for educational content thereby avoiding any lag between need and availability.

In one or more embodiments, a system is capable of evaluating search data and/or social media content. The data is aggregated from a plurality of users. Further, the data may be collected over a period of time. The system is capable of analyzing the data to identify inquiries that are asking for educational content. In one aspect, the system is capable of identifying inquires asking for the same or similar information. These inquires may be viewed as being different versions of a same inquiry and grouped together.

In one or more embodiments, the system is capable of ranking the inquires. In one aspect, for those inquiries determined to be highly ranked, the system is capable of determining whether educational content exists. For example, the system is capable of performing searches in an attempt to locate information sought by the inquiries and determining whether the results include educational content. Thus, the system is capable of determining, from the searching, whether educational content exists for highly ranked inquiries.

As used within this disclosure, the term "educational content" means material intended for use in teaching skills or knowledge to users or material intended for use in developing skills or knowledge in users. Examples of educational content include, but are not limited to, papers, presentations, training courses, seminars, etc. The educational content may be digital content. In some cases, the educational content may be analog, e.g., paper-based materials, but have one or more digital records of the existence of such content.

In one or more embodiments, the system is capable of identifying those inquiries, e.g., highly ranked inquiries, for which educational content is not found. In such cases, the system is capable of providing an indication that educational content is needed (e.g., is not available). In one aspect, the system is capable of comparing the information or topic of the inquiries determined to lack educational content with a database of subject matter experts. The system, for example, initiates communication with a subject matter expert that matches the information sought or the topic of the highly ranked inquiry.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a network computing system 100 in which the inventive arrangements may be implemented. Network computing system 100 contains a network 105, devices 110, 115, and 120, and a cognitive analysis system 125. Network computing system 100 may include one or more search services 150 and one or more data sources 155. Network computing system 100 may also include one or more social networking platforms 160. The noted elements are interconnected, e.g., communicatively linked, by network 105.

Network 105 is the medium used to provide communication links between various devices and data processing systems connected together within network computing system 100. Network 105 may include connections, such as wired communication links, wireless communication links, or fiber optic cables. Network 105 may be implemented as, or include, one or more or any combination of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), and so forth.

Devices 110, 115, and 120 are capable of coupling to network 105 via wired and/or wireless communication links. Devices 110, 115, and/or 120 may be implemented as personal computers, portable computing or communication devices, network computers, tablet computers, mobile phones, or the like. Further, device 110 may be implemented as one type of device, while device 115 is implemented as another different type of device, while device 120 is implemented as yet another different type of device. Devices 110-120 may communicate with search service 150, data sources 155, and/or social networking platform 160 via network 105.

Search service 150 is capable of coupling to network 105 via wired and/or wireless communication links. In one aspect, search service 150 is implemented as one or more interconnected computer systems, e.g., servers. Search service 150 is capable of executing suitable operational software to support receipt and/or execution of inquiries from devices 110, 115, and/or 115. For example, search service 150 may be implemented as a data processing system executing a search engine. Search service 150 may be configured to index or crawl data sources 155.

Data sources 155 are capable of coupling with network 105 through wired and/or wireless communication links. Examples of data sources 155 include, but are not limited to, a Website and/or Webpage, a directory service, a network accessible storage device, and so forth. In one embodiment, search service 150 is capable of indexing content of data sources 155. Search service 150 is capable of receiving inquiries from devices 110-120 requesting information. The inquiries may be queries directed to locating particular ones of data sources 155. Search service 150 is capable of executing the inquires, e.g., the queries, and providing results of the inquiries to the requesting device(s).

In one or more embodiments, an inquiry is a computer-based search for information sent from or initiated from a device. The search may be sent from the device to a search service. Example inquiries include, but are not limited to, Internet and/or Web searches, intranet searches, etc. Searches may be specified using Boolean operators, as natural language, or the like. A search may be translated into a more formal query or queries by the search service for purposes of execution and/or searching indexed data sources.

Social networking platform 160 is capable of coupling with network 105 through wired and/or wireless communication links. Social networking platform 160 is implemented as one or more interconnected computer systems, e.g., servers. As defined herein, a "social networking platform" is a computing system, or systems, that allows users to build social networks or social relations among people who share similar interests, activities, backgrounds or real-life connections.

Through social networking platform 160, users, e.g., users A, B, and/or C, may send communications using devices 110, 115, and 120, respectively, through different mechanisms such as by posting messages or other media, commenting on messages, posts, or other media, replying to messages, and performing other operations such as expressing sentiment (e.g., "liking") a communication or item of media, sharing the communication or item of media, expressing an emotional sentiment, and so forth. In the context of social networking platform 160, actions such as posting, replying, liking, sharing, expressing sentiment, and so forth are programmatic actions that are monitored and persisted within social networking platform 160, e.g., within a data storage device in a data structure within and/or accessible by, social networking platform 160.

In another aspect, a computer inquiry is a social media content item that expresses a need, request, or search for information. Examples of social media content items include, but are not limited to, posts, replies, comments, files such as word processing documents, spreadsheets, presentations, drawings, multimedia files (e.g., audio, video, audio-visual), shares, etc. as stored and/or referenced by a social networking platform. Another example of a social media content item is an expression of sentiment such as a "like" of a first user toward a social media content item (e.g., a post, reply, comment, etc.) of another user on a social networking platform.

Cognitive analysis system 125 is capable of coupling with network 105 through wired and/or wireless communication links. In the example of FIG. 1, cognitive analysis system 125 includes a cognitive analysis engine (cognitive engine) 130, a subject matter expert database 135, aggregated search data 140, and aggregated social media (SM) content 145.

In an embodiment, cognitive engine 130 is capable of communicating with search service 150 and retrieving search data, e.g., computer based searches, received by search service 150 from a plurality of different users, e.g., users A, B, and C, over a period of time. Cognitive engine 130 is capable of retrieving the search data from search service 150 from time to time, periodically, etc. Cognitive engine 130 stores the search data as aggregated search data 140. Aggregated search data 140 is stored as a data structure within a data storage device. For example, aggregated search data 140 may be stored within a database, as tables, as markup language documents, as text files, etc.

In another embodiment, cognitive engine 130 is capable of communicating with social networking platform 160 and retrieving social media content from a plurality of different users, e.g., users A, B, and C, over a period of time. Cognitive engine 130 is capable of retrieving social media content from social networking platform 160 from time to time, periodically, etc. In one aspect, the social media content provided to cognitive engine 130 from social networking platform 160 may be social media content that users of social networking platform 160 have chosen, or opted, to share or make available for use by cognitive analysis system 125. Cognitive engine 130 stores the social media content as aggregated SM content 145. Aggregated SM content 145 is stored as a data structure within a data storage device. For example, aggregated SM content 145 may be stored within a database, as tables, as markup language documents, as text files, etc.

In another embodiment, cognitive analysis system 125 includes a subject matter expert database 135. Subject matter expert database 135 stores records for different users considered to be subject matter experts. Subject matter expert database 135 may include a directory of users and specify topics of subject matter expertise held by the various users in the directory. For example, cognitive analysis system 125 may be used within a business entity, an educational institution, or as a publicly available service. Subject matter expert database 135 may be implemented as a directory of users or members specifying subject matter expertise such as specializations, qualifications, specialized knowledge, topics of specialization, and the like for the users.

Cognitive engine 130 is capable of processing aggregated search data 140 and/or aggregated SM content 145. For purposes of illustration and ease of description, aggregated search data 140 and aggregated SM content 145 may be referred to collectively within this disclosure as "inquiry data." Cognitive engine 130 is capable of determining or extracting inquiries from aggregated search data 140 and/or aggregated SM content 145. Cognitive engine 130 is capable of determining topics of the inquiries. Cognitive engine 130 is further capable of determining whether inquiries from aggregated search data 140 and/or aggregated SM content 145 are seeking or are requesting educational content.

In one aspect, cognitive engine 130 is capable of performing Natural Language Processing (NLP) on aggregated search data 140 and/or aggregated SM content 145. NLP is a field of computer science, artificial intelligence, and computational linguistics which implements computer processes to facilitate interactions between computer systems and human (natural) languages. In performing NLP, cognitive engine 130 is capable of deriving computer-understandable meaning from natural language input such aggregated search data 140 and/or aggregated SM content 145. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a text's meaning, including entities, named entities, the semantic roles of entities mentioned in the sentence, and quantification information, such as cardinality, iteration, and dependency.

In another embodiment, cognitive engine 130 is capable of performing sentiment analysis on aggregated search data 140 and/or aggregated SM content 145. Sentiment analysis is sometimes referred to as "opinion mining." Sentiment analysis refers to the identification and extraction of subjective information in source materials such as aggregated search data 140 and/or aggregated SM data 145. In performing sentiment analysis, cognitive engine 130 is capable of determining the attitude, opinion, and/or contextual polarity expressed in text. In performing sentiment analysis, cognitive engine 130 may utilize technologies such as NLP, text analysis, computational linguistics, etc.

Cognitive engine 130 may determine the particular topics of inquiries found within aggregated search data 140 and/or aggregated SM content 145 for which users are searching for educational content. Cognitive engine 130 may search available data sources, e.g., data sources 155 and/or other data sources that may be available to cognitive analysis system 125, to determine whether educational content exists for the topics. In cases where cognitive engine 130 determines that no educational content exists, cognitive engine 130 is capable of finding a subject matter expert from subject matter expert database 135. Cognitive engine 130, for example, compares the topic of computer inquiries for which educational content is sought with entries in subject matter expert database 135. In one or more embodiments, cognitive engine 130 may notify a subject matter expert found in subject matter expert database 135 that a need for educational content for a particular topic or topics exists. Cognitive engine 130 may provide the notification to the subject matter expert over a selected communication channel.

As defined herein, the term "communication channel" means a mode of communication using one or more electronic devices. A communication channel is associated with a specific format and/or communication protocol for sending messages. For example, a mobile device is capable of sending a message to another mobile device using Short Message Service (SMS), electronic mail (email), as a video call, a voice call, or as a post to a social networking system. Each of SMS, email, video calls, voice calls, and posts to a social networking system is considered a different communication channel.

In one or more embodiments, cognitive analysis system 125 is capable of determining what educational/enablement topics users are looking for. Cognitive analysis system 125 is capable of performing an analysis from time-to-time, at regular intervals, etc. of aggregated search data 140 and/or aggregated SM content 145. Cognitive analysis system 125 is capable of cognitively tying together "like" computer inquires (e.g., like queries from aggregated search data 140 and/or like computer inquiries from discussions within aggregated SM content 145) and identifying whether educational content exists for the searches and/or discussion. In the event that cognitive analysis system 125 determines that educational content does not exist, cognitive analysis system 125 is capable of sending a request to a person or persons identified as a subject matter expert based upon a matching of the subject matter expert to the topics of computer inquires (e.g., queries and/or discussion). The request, for example, may ask the subject matter expert for educational content and/or to create educational content.

Thus, in one or more embodiments cognitive analysis system 125 is capable of addressing education gaps with users, with subject matter experts, and/or other curriculum content. Cognitive analysis system 125 is able to address the gaps by determining, at least in part, the most searched topics and/or discussed topics. Cognitive analysis system 125 is capable of finding experts for the topics of the searches and/or social media discussion.

FIG. 1 is provided for purposes of illustration and is not intended to limit the inventive arrangements described herein. It should be appreciated that network computing system 100 may include fewer elements than shown or more elements than shown. For example, network computing system 100 may include fewer or more servers, client devices, etc. In addition, one or more of the elements illustrated in network computing system 100 may be merged or combined.

Figure 2:
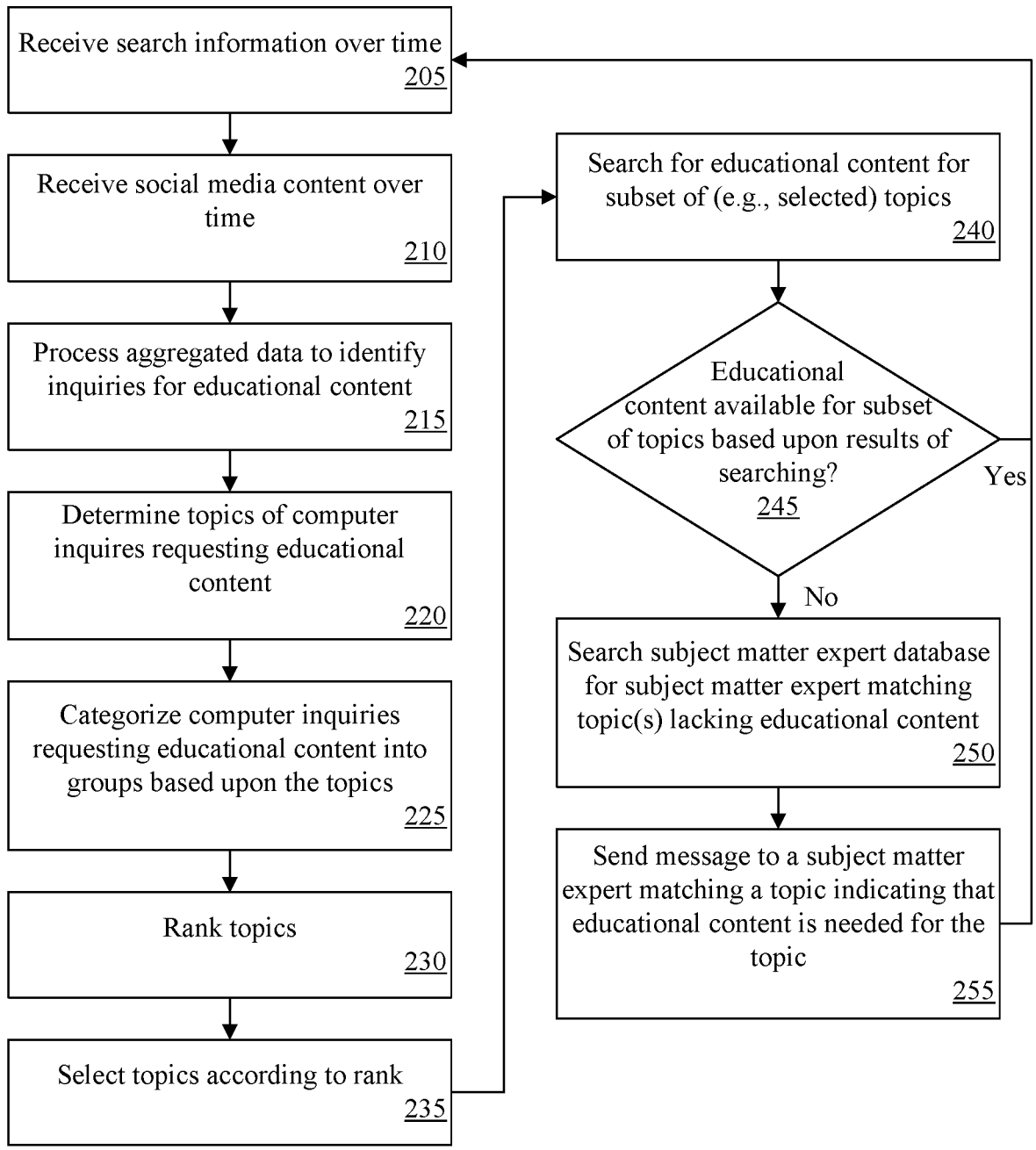
FIG. 2 illustrates a method of curriculum evaluation and creation using cognitive computing.

FIG. 2 illustrates a method 200 of curriculum evaluation and creation using cognitive computing. Method 200 may be performed by a system such as cognitive analysis system 125 described in connection with FIG. 1.

In block 205, the system receives search information over time. For example, at regular intervals, from time-to-time, etc., the system may request and/or receive search data from one or more search services. The search information is for a plurality of different users. As noted, the search data includes inquires, e.g., searches. The system is capable of aggregating and storing the search data in a computer readable storage device.

In block 210, the system receives social media content over time. For example, at regular intervals, from time-to-time, etc., the system may request and/or receive social media content from one or more social networking platforms. The social media content is for a plurality of different users. The system is capable of aggregating and storing the social media content in a computer readable storage device.

In block 215, the system processes the aggregated data to identify inquiries for educational content. In one or more embodiments, the system is capable of processing the aggregated data to differentiate between inquires for data in general and inquires that are searching for educational content. For example, regarding the aggregated SM content which may include natural language and/or other discussion, the system is capable of first identifying inquiries therein. The search data is already specified as inquiries.

The system is capable of parsing the inquiries for one or more key words. Example key words may include, but are not limited to, "training," "education," "course," "enablement," "session," "how do I," "how <wildcard term> works," etc. The system is capable of searching the queries for words and/or phrases that denote a search for educational content.

In one or more other embodiments, the system is capable of processing social media content to identify computer inquiries therein also requesting educational content. The system is capable of processing messages, posts, etc., as described above to recognize computer inquiries requesting educational content.

In block 220, the system determines topics of the inquires identified in block 215 requesting educational content (e.g., the "identified computer inquires"). The system may utilize NLP or other cognitive computing techniques to determine the particular topics of the identified inquiries.

In block 225, the system is capable of categorizing the identified inquiries based upon the topics. For example, the system is capable of assigning identified inquiries directed to a similar and/or a same topic into a same group. Thus, the resulting groups include inquires that request educational content and that are for a same or similar topic. In this regard, the inquires of a same group are considered to be different versions of a same inquiry or inquiries directed to the same or similar subject matter (e.g., topic).

As an illustrative example, the system may determine that topics of identified computer inquiries include "zVM," "z/VM," and "VM for z" are actually searching for the same information and/or are the same search. In that case, the system may assign each of the identified computer inquires with a topic of "zVM," "z/VM," and "VM for z" to a same group. In one or more embodiments, the system is capable of learning to recognize like or similar topics as new correlations are found.

In block 230, the system is capable of ranking the topics. The system may use ranking to determine the importance of a given topic. For example, the system is capable of determining the most searched for topics. In one embodiment, the system may rank the topics by determining the number of inquiries within each group. Since each group corresponds to a topic, e.g., a single topic, the system may use the number of inquiries in the group as the rank, where higher ranks indicate greater importance. In an aspect, for an inquiry in a group from a first user, the system may count a positive sentiment expressed by a different user for the inquiry as a separate or additional inquiry.

In another embodiment, the system is capable of ranking topics based upon the number of different users searching for the topic. In an aspect, for an inquiry in a group from a first user, the system may count a positive sentiment expressed by a different user for the inquiry as a separate or additional inquiry from a different user. Higher ranks indicate greater importance.

In another embodiment, the system is capable of ranking topics based upon a combination of number of inquiries and/or number of different users searching for the topic. The system may multiply each of the different quantities by a quantity specific factor between 0 and 1 with the results being summed to generate the ranking. Higher ranks indicate greater importance.

In other example implementations, the system is capable of ranking topics based upon frequency of inquires (e.g., searches, frequency of posts, and/or frequency of requests). The system may multiply each of the different quantities by a quantity specific factor between 0 and 1 with the results being summed to generate the ranking. Higher ranks indicate greater importance.

While specific examples of ranking are provided, in other embodiments, one or more or any combination of the ranking techniques discussed above may be used in various combinations. Further, for purposes of ranking, the system may generate a score that is used for ranking. The score may be any quantity described above or sum of any plurality or combination of the quantities described above with or without weighting factors.

In block 235, the system is capable of selecting one or more topics, e.g., a subset of the topics, based upon rank. For example, the system may select the top "N" topics, where "N" is an integer value such as 1, 2, 3, 4, 5, etc. The top N topics are the N topics of highest rank. For purposes of discussion, the topics selected in block 235 based upon rank may be referred to as the "selected topics" or the "subset" of topics.

In block 240, the system is capable of searching for educational content for the subset of topics. The system, for example, may conduct searches for educational content for each topic of the subset. In one aspect, for a given topic, the system may submit the searches (e.g., from search data) and/or inquiries (e.g., from the social media data) from the group of inquiries associated with the given topic. In another aspect, the system is capable of generating searches by using the topic and/or each of the similar or same topics belonging to a same group and add terms whether appended, prepended, etc., to generate searches. For example, the system may add terms to the topics such as "educational content for <topic>," "training material for <topic>," etc. The system further may construct searches by breaking the topic and/or inquiries of the group associated with the topic into keywords that may be searched individually or in combination.

In block 245, the system is capable of determining whether educational content is available for the subset of topics based upon results of the searching. If educational content is not available, e.g., is needed, method 200 can continue to block 250. If educational content is available, e.g., not needed, method 200 may loop back to block 205 to continue processing.

In one or more embodiments, the system is capable of using NLP or other text processing techniques to determine whether results found for each topic of the subset are considered educational content. In one or more embodiments, the system is capable of determining whether results from the searching have a high likelihood of being education content. If so, the system concludes that educational content is available.

For example, the system may evaluate the results from searching a given topic for words, e.g., key words, such as "training," "education," "course," "enablement," "session," etc. In response to detecting one or more of the key words, the system determines that the result is educational content. As such, the system determines that educational content does exist, e.g., is available, for the topic. In response to not detecting any of the key words within results for a topic of the subset, the system is capable of determining that educational content is needed for the topic as educational content is not available.

In one aspect, the system outputs an indication of whether educational content is available for each topic in the subset. For example, the system is capable of storing the indication(s) that educational content is/is not available in a data storage device. The system may store the results as a report.

In one or more embodiments, the system is capable of scoring the search results. The scoring of search results may be a measure of strength of the enablement material (e.g., result) found from the searching. For example, the system may perform analysis as described above on results of the searching and assign a strength rating (e.g., score) to the results, whether to each result independently or to the results of a topic as a group. The strength rating may be determined based upon attributes like relevance of result(s), keywords, quantity of results, how up-to-date the results are (e.g., the date of the result compared to a current date or search date), whether the material of the result is positively reviewed, how discoverable material is for a given topic, etc.

In one embodiment, the system is capable of using the of the search results to determine whether educational content is needed for a topic. For example, if the system searches and locates results with a score less than a threshold, the system may determine that educational content is needed (e.g., not available) despite locating results (which may include educational content) from the searching. As discussed, the score may be for the search results as a whole, e.g., as a group, or for individual results. In the case where the scoring is for individual results, the system may require a minimum number of results to have a score exceeding a threshold in order to determine that no educational content is needed.

In another embodiment, the system is capable of incorporating the scoring of the search results into the prior ranking described with reference to block 230. Incorporating the ranking of the search results may cause reordering of the initial ranking so that the top "N" topics from block 230 may change. As an illustrative example, the system may calculate a score for the topics using one or more of the quantities described above where each quantity may be weighted using a value between 0 and 1. The system may reduce the score by the score of the search results for the topic. Thus, the top "N" topics after incorporating the ranking of search results reflects both the need for educational content and the quality of existing search results/educational content. The system may determine that only those topics having a score, after accounting for the score of the search results, that exceeds a threshold require educational content.

In any case, the system is capable of determining the particular topics for which educational content is available based upon a score and/or ranking of the topics without considering the search results. The system is also capable of determining the particular topics for which educational content is available based upon a ranking and/or scoring of the topics that also takes into consideration strength of the search results found.

Continuing with block 250, the system is capable of searching a subject matter expert database to find a user with subject matter expertise matching the topic(s) for which educational content is needed. For example, in response to determining that educational content for a specific topic is needed, the system is capable of leveraging an existing database of experts. The system may use the listing of experts to select a potential presenter for a session on the topic in need of educational content.

In one aspect, the system may search the subject matter expert database for a subject matter expert by matching the topic in need of educational material with a paper, a book, other document, or profile of a subject matter expert. In another aspect, the system may search the subject matter expert database for a subject matter expert by determining the subject matter expert most referred to or referenced for the given topic.

In block 255, the system is capable of sending a message to the subject matter expert matching the topic in need of educational content. The message may specify or indicate that educational content is needed for the topic. For example, the system is capable of posting a message to the subject matter expert on a social networking platform, sending an electronic mail, etc.

In one or more embodiments, the system may provide an electronic form to the subject matter expert. The electronic form may include fields adapted to receive user input from the subject matter expert such as links or references to existing educational content from the subject matter expert. The educational content may include presentations, papers, recordings, online courses, training courses, etc. The system, in response to receiving the form, may add the specified educational content to a database of such content for the topic. As such, subject matter experts are encouraged to create the educational content due to increased status in the topic or field. In addition, the creation and availability of educational content means that the subject matter experts are less likely to be interrupted with questions about the topic from other users.

While method 200 is illustrated as a series of sequential blocks, in one or more embodiments, search data and/or social medial content may be continually received and/or updated. For example, search data and/or social media content may be received in real time. In one or more other embodiments, the system is capable of initiating the processing described in connection with method 200 at regular intervals.

An example implementation in accordance with another embodiment is described below for purposes of illustration. Consider a situation where User A is considering using a particular computing architecture for a computing platform being created. User A performs one or more searches using available computer-based search tools within an organization, e.g., a business entity. The searches may be for educational content on a particular type of architecture or computing component for the architecture, e.g., a database for a particular type of operating system. For example, User A's search may be "Linux on z education."

A system as described herein is capable of analyzing searches conducted on the search tools within the organization to determine that searches such as "zLinux education," "Linux on z course," and "LinuxOne training" are all related. The system is capable of combining like search terms and ranking the search terms (e.g., the topic). In this example, the system is capable of determining that user A's search of "Linux on z education" is the same as the other searches and, as such, is among the highest ranked searches, e.g., most popular searches within the organization.

The system performs a search for each of the related names (zLinux education, LinuxOne education, etc.) and for key words (zLinux training, zLinux enablement, etc.). Through the searching and evaluation of the returned results, the system determines that the educational content is not available.

The system compares the search and/or topic of the search with the SME database. The system is capable of providing a report, for example, to one or more or each of the matched subject matter experts listing the highest ranked searches matched to each respective subject matter expert.

Figure 3:
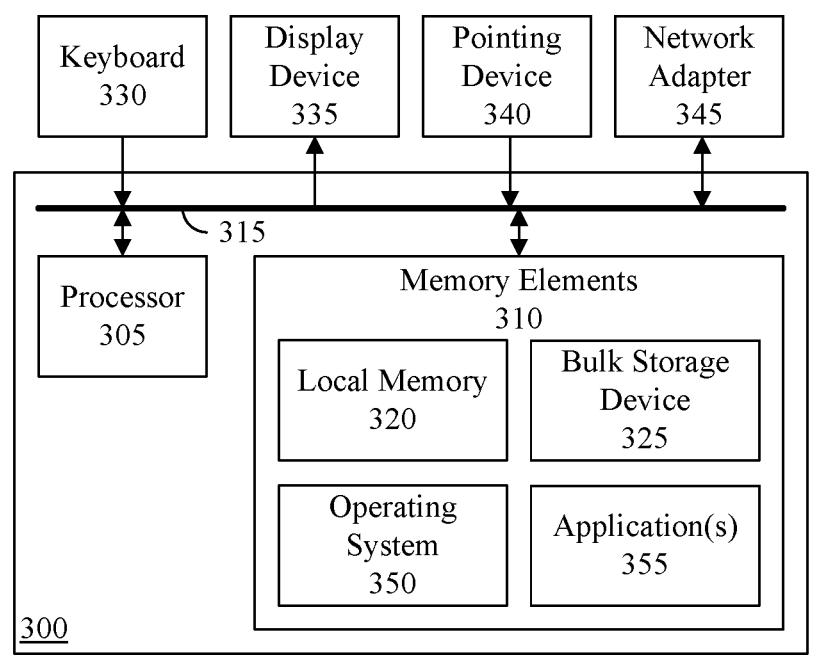
FIG. 3 illustrates an example architecture for a data processing system.

FIG. 3 illustrates an example architecture 300 for a data processing system. Architecture 300 includes at least one processor 305 coupled to memory elements 310 through interface circuitry 315. Examples of interface circuitry 315 include, but are not limited to, a bus, an input/output (I/O) subsystem, a memory interface, or other suitable circuitry. Architecture 300 stores program code within memory elements 310. Processor 305 executes the program code accessed from memory elements 310 via interface circuitry 315.

Memory elements 310 include one or more physical memory devices such as, for example, a local memory 320 and one or more bulk storage devices 325. Local memory 320 may be implemented as a random access memory (RAM) or other non-persistent memory device(s) generally used during actual execution of the program code. Bulk storage device 325 may be implemented as a hard disk drive (HDD), solid state drive (SSD), or other persistent data storage device. Architecture 300 also may include one or more cache memories (not shown) that provide temporary storage of at least some program code in order to reduce the number of times program code must be retrieved from the bulk storage device during execution.

Input/output (I/O) devices such as a keyboard 330, a display device 335, a pointing device 340, and one or more network adapters 345 optionally may be coupled to architecture 300. The I/O devices may be coupled to architecture 300 either directly or through intervening I/O controllers. Architecture 300 may include one or more additional I/O device(s) beyond the examples provided. In some cases, one or more of the I/O device(s) may be combined as in the case where a touch sensitive display device 335 (e.g., a touchscreen) is used. In that case, display device 335 may also implement keyboard 330 and/or pointing device 340.

Network adapter 345 is a communication circuit configured to establish wired and/or wireless communication links with other devices. The communication links may be established over a network or as peer-to-peer communication links. Accordingly, network adapter 345 enables architecture 300 to become coupled to other systems, computer systems, remote printers, and/or remote storage devices through intervening private or public networks. Example network adapter(s) 345 may include, but are not limited to, modems, cable modems, Ethernet cards, bus adapters, connectors, ports, and so forth. Other examples of network adapter 345 may be a wireless transceiver and/or a wireless radio. Network adapter(s) 345 may be configured for short and/or long range wireless communications.

Memory elements 310 store an operating system 350 and an application 355. Operating system 350 and application 355, being implemented in the form of executable program code, are executed by architecture 300. As such, operating system 350 and/or application 355 may be considered an integrated part of any system implemented using architecture 300. Application 355 and any data items used, generated, and/or operated upon by architecture 300 while executing application 355 are functional data structures that impart functionality when employed as part of architecture 300.

As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by a processor.

Architecture 300 may be used to implement a computer system or other type of device that is suitable for storing and/or executing program code. In the case where architecture 300 is used to implement a server type of data processing system, operating system 350 may be a server-side operating system; and, application 355 may be a server-side application that, when executed, causes the server to perform the various operations described herein. For example, cognitive analysis system 125 may be implemented using one or more interconnected systems each having an architecture similar to, or the same as, that of architecture 300.

In the case where architecture 300 is used to implement a device such as device 110 of FIG. 1, operating system 350 may be a client-side operating system; and, application 355 may be a client-side application that, when executed, causes the device to perform the various operations described herein. For example, one or more of devices 110-120 may be implemented using an architecture similar to, or the same as, that of architecture 300.

The examples described herein are not intended to be limiting of the various embodiments described. In this regard, architecture 300 may be used to implement any of a variety of systems or devices having a processor and memory that is capable of performing the functions described within this disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   collecting inquiry data, aggregated for a period of time, within a social network from a plurality of users that have opted into sharing data within the social network;
   processing, for the period of time, the inquiry data to identify inquiries requesting a plurality of different contents, within the social network, by the plurality of users;
   identifying, from the inquiries, inquiries that request educational content;
   categorizing the inquiries that request education content into a plurality of topics;
   ranking, for the period of time, the plurality of topics;
   selecting, based upon the ranking, a topic of the plurality of topics;
   searching for a subset of topics based on the selected topic;
   determining that corresponding educational content is not available for the selected topic based at least on results of the searching;
   searching, based upon the determining, a subject matter expert database for a human expert based upon the selected topic; and
   sending, to the human expert, an electronic message indicating a need for the corresponding educational content on the selected topic.

2. The method of claim 1, wherein the inquiries are social media content items that express a need, request, or search for information.

3. The method of claim 1, wherein the inquiry data includes searches directed to a search service.

4. The method of claim 1, wherein the ranking is based, at least in part, upon a number of inquiries for a respective topic.

5. A computer hardware system, comprising: a processor configured to initiate the following executable operations:
- collecting inquiry data, aggregated for a period of time, within a social network from a plurality of users that have opted into sharing data within the social network;
- processing, for the period of time, the inquiry data to identify inquiries requesting a plurality of different contents, within the social network, by the plurality of users;
- identifying, from the inquiries, inquiries that request educational content;
- categorizing the inquiries that request education content into a plurality of topics;
- ranking, for the period of time, the plurality of topics;
- selecting, based upon the ranking, a topic of the plurality of topics;
- searching for a subset of topics based on the selected topic;
- determining that corresponding educational content is not available for the selected topic based at least on results of the searching;
- searching, based upon the determining, a subject matter expert database for a human expert based upon the selected topic; and
- sending, to the human expert, an electronic message indicating a need for the corresponding educational content on the selected topic.

6. The system of claim 5, wherein the inquiries are social media content items that express a need, request, or search for information.

7. The system of claim 5, wherein the inquiry data includes searches directed to a search service.

8. The system of claim 5, wherein the ranking is based, at least in part, upon a number of inquiries for a respective topic.

9. A computer program product, comprising:
- a computer readable storage medium having program instructions embodied therewith, the program instructions executable by a computer hardware system to cause the computer hardware system to perform:
- collecting inquiry data, aggregated for a period of time, within a social network from a plurality of users that have opted into sharing data within the social network;
- processing, for the period of time, the inquiry data to identify inquiries requesting a plurality of different contents, within the social network, by the plurality of users;
- identifying, from the inquiries, inquiries that request educational content;
- categorizing the inquiries that request education content into a plurality of topics;
- ranking, for the period of time, the plurality of topics;
- selecting, based upon the ranking, a topic of the plurality of topics;
- searching for a subset of topics based on the selected topic;
- determining that corresponding educational content is not available for the selected topic based at least on results of the searching;
- searching, based upon the determining, a subject matter expert database for a human expert based upon the selected topic; and
- sending, to the human expert, an electronic message indicating a need for the corresponding educational content on the selected topic.

10. The computer program product of claim 9, wherein the inquiries are social media content items that express a need, request, or search for information.

11. The computer program product of claim 9, wherein the inquiry data includes searches directed to a search service.

12. The computer program product of claim 9, wherein the ranking is based, at least in part, upon a number of inquiries for a respective topic.

\* \* \* \* \*